(12) United States Patent
Cordova (10) Patent No.: US 8,482,834 B2
(45) Date of Patent: Jul. 9, 2013

(54) WINDOW TINTING SYSTEMS

(76) Inventor: David A. Cordova, Houston, TX (US)

( * ) Notice: Subject to any disclaimer, the term of this patent is extended or adjusted under 35 U.S.C. 154(b) by 26 days.

(21) Appl. No.: 13/311,983

(22) Filed: Dec. 6, 2011

(65) Prior Publication Data
US 2012/0140308 A1 Jun. 7, 2012

Related U.S. Application Data

(60) Provisional application No. 61/420,704, filed on Dec. 7, 2010.

(51) Int. Cl.
*G02B 26/02* (2006.01)
*G02B 27/00* (2006.01)
*G02B 5/24* (2006.01)

(52) U.S. Cl.
USPC .......................... 359/228; 359/601; 359/886

(58) Field of Classification Search
USPC ................ 359/227–228, 244, 601–610, 614, 359/665–666, 738, 885–886; 296/211–223, 296/96.19
See application file for complete search history.

(56) References Cited

U.S. PATENT DOCUMENTS

| | | | |
|---|---|---|---|
| 5,390,045 A * | 2/1995 | Bernard, Jr. | ................. 359/275 |
| 5,587,828 A | 12/1996 | Bernard, Jr. | |
| 2003/0210355 A1 | 11/2003 | Dao | |
| 2008/0007086 A1 | 1/2008 | Pattikonda | |

* cited by examiner

*Primary Examiner* — Tuyen Tra
(74) *Attorney, Agent, or Firm* — RG Patent Consulting LLC; Rachel Gilboy (57) ABSTRACT

Window tinting systems provides a vehicle window tint control within the interior of a vehicle permitting a driver and/or passenger to adjust the level of tint of the vehicle window. The system may generally comprise an integrally wired photochromic component, a wiring assembly, a driver's control panel, and at least one passenger's controller. A specialty film may be coupled to the vehicle window and may serve to control the amount of sun light penetrating the vehicle window. The driver's control panel and passenger's control panel may adjustably control the tint level of the vehicle window.

17 Claims, 5 Drawing Sheets

Master Control Panel

WINDOW TINTING SYSTEMS

CROSS-REFERENCE TO RELATED APPLICATION

The present application is related to and claims priority from prior provisional application Ser. No. 61/420,704, filed Dec. 7, 2010, which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

1. Field of the Invention

The present invention relates generally to the field of tinted vehicle windows and more specifically relates to an OEM and/or retro-market installable vehicle window tinting system for use with a vehicle.

2. Description of the Related Art

Many individuals in modern society use automobiles for work, school, or recreation. Automobiles offer consumers a simple and efficient means of traveling from one destination to the next. Most considerate drivers realize the importance of staying alert behind the wheel and because of this pay close attention to the comings and goings of traffic, their speed, road signs, stop lights, and other known hazards of the road.

Unfortunately, as many drivers would attest, there are those obstacles that even the most conscientious of drivers cannot avoid. In particular, driving in the direction of sunlight can be both difficult and dangerous. Incoming sunlight often results in unavoidable "blind spots," the glare of intense sunlight can make it almost impossible to see the road ahead. The low-contrast vision caused by glare from the sun may be distracting and may directly affect driving comfort and safety. Burning of the eyes, fatigue, and eye strain are often symptoms of blinding glare caused by ultraviolet rays which may make even the shortest of journeys unsafe, exhausting, and stressful.

Traditional tinted windows offer the advantage of reducing the amount of glare, providing privacy, and making the contents of the interior of a vehicle more difficult to discern, but there are many occasions when it is desirable to have unobstructed vision which may be best realized with non-tinted windows. Further, many local and state governments have specific guidelines to the degree of which a window may be tinted. Consequently, if a vehicle's windows are tinted in a shade too dark to meet these guidelines, the vehicle's operator may be subject to serious fines and penalties. It is desirable to that driving be made safe and comfortable for drivers and passengers as well as the vehicle be protected from the damaging effects of the sun.

Various attempts have been made to solve the above-mentioned problems such as those found in U.S. Pat. And Pub. Nos. 2008/0007086 to Pattikonda; 5,587,828 to Bernard et al; and 2003/0210355 to Dao. This prior art is representative of vehicle tinting systems. None of the above inventions and patents, taken either singly or in combination, is seen to describe the invention as claimed.

Ideally, a user-preferred vehicle window tinting system should be safe in operation and yet, would operate reliably and be manufactured at a modest expense. Thus, a need exists for a tinting system for vehicle windows allowing the vehicle driver to adjust the level of the window's tint using a control knob from within the vehicle.

BRIEF SUMMARY OF THE INVENTION

In view of the foregoing disadvantages inherent in the known vehicle tinting art, the present invention provides a vehicle tinting system for adjustably tinting the windows of a vehicle. The general purpose of the present invention, which will be described subsequently in greater detail, is to provide a novel and safe vehicle tinting system permitting a vehicle driver to adjust the level of tint of the vehicle's windows according to conditions and user-preference.

An interiorly controlled vehicle window tinting system is disclosed herein, in a preferred embodiment comprising: at least one vehicle window comprising; an inner surface; an outer surface; at least one transparent and pliable film layer applied to the vehicle window(s); a tubing assembly comprising tubing which is transparent and filled with at least one arcable fluid (mercury vapor or the like) and having a wire routed through an interior of the tubing, said wire attached to a connection bus located at an end of the pliable film layer.

The pliable film layer preferably comprises the tubing having continuous loops that are effectively evenly spaced apart relative to the vehicle window (and to each other.) The pliable film layer may be located on the outer surface in certain embodiments and in alternate embodiments pliable film layer may be located between the outer surface and the inner surface as a 'sandwiched layer'. The vehicle window(s) are defined by the inner surface and the outer surface. The vehicle window may be laminated and comprises a substantially flat profile in most cases. Vehicle window(s) may comprise at least one side window, a windshield, and a rear window.

The pliable film layer preferably comprises plastic; however may comprise other suitable equivalent materials in alternate embodiments. The plastic is preferably chemically treated to embed characteristics of photochromism into a molecular structure of the plastic wherein the plastic darkens when exposed to ultraviolet rays and lightens to translucent when the ultraviolet rays are removed; wherein the interiorly controlled vehicle window tinting system is able to generate a controlled amount of the ultraviolet rays with short wave lengths.

The connection bus is connected via electrical wiring to at least one controller located in an interior of a vehicle; wherein the controller (may be in a control panel on the dash and/or console, and/or door panel or other suitable location) is in electrical communication with a power supply of the vehicle. The controller is located in the interior and is accessible to and operable by an occupant (driver controls ultimately, passengers may also control) to manipulate a degree of tint by varying a quantity of ultraviolet light produced by the arcable fluid which is determined by an amount of current flow controlled by the controller.

The controller may comprise a plurality of adjustable dials; wherein the tint of each of the vehicle windows are separately (or simultaneously) controllable via the controller (on the control panel.) The controller has at least a lock position and a standby position and a plurality of positions in between to regulate the amount of current flow. The lock position is activated during a drive condition and the standby position is activated by a non-drive condition (when parked for example to keep vehicle cool.) The quantity (and quality/length) of ultraviolet light produced is dependent on an amount of electricity applied to the wire. The controller, when manipulated, controls an amount of current and resultant heat, that is applied to the wire(s) positioned within the tubing; and thereby the interiorly controlled vehicle window tinting system is useful to limit an amount of light entering the vehicle window(s) according to a user's preference.

A kit is disclosed for retro-fitting to an existing vehicle or the system may be installed OEM in vehicles from the factory as an option.

A method of use is disclosed herein for the interiorly controlled vehicle window tinting system comprising the steps of: energizing a controller; activating the controller; creating an arc; and tinting at least one vehicle window (or combination of windows) to at least one user-preferred degree (windows may each comprise a different level of tint.) The method may also comprise the step of adjusting the tinting via manipulating the controller.

The present invention holds significant improvements and serves as a vehicle tinting system for adjustably tinting the windows of a vehicle. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, interiorly controlled vehicle window tinting system, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to an adjustable vehicle tinting system permitting a vehicle driver and/or vehicle passenger(s) to adjust the level of tint of the vehicle's windows via a plurality of controllers located within the vehicle.

Generally speaking, the present invention provides a user-preferred vehicle window tint control console for within the interior of a vehicle permitting a driver or a passenger to adjust the level of tint of the vehicle window. Reducing glare and blocking ultraviolet rays, the present invention is a practical product invention which offers consumers a safe and comfortable means of driving in the sun. Enabling the driver to control the degree of tint in accordance to local or state regulations may spare the driver costly tickets and citations associated with driving a vehicle with dark tinted windows.

Figure 1:
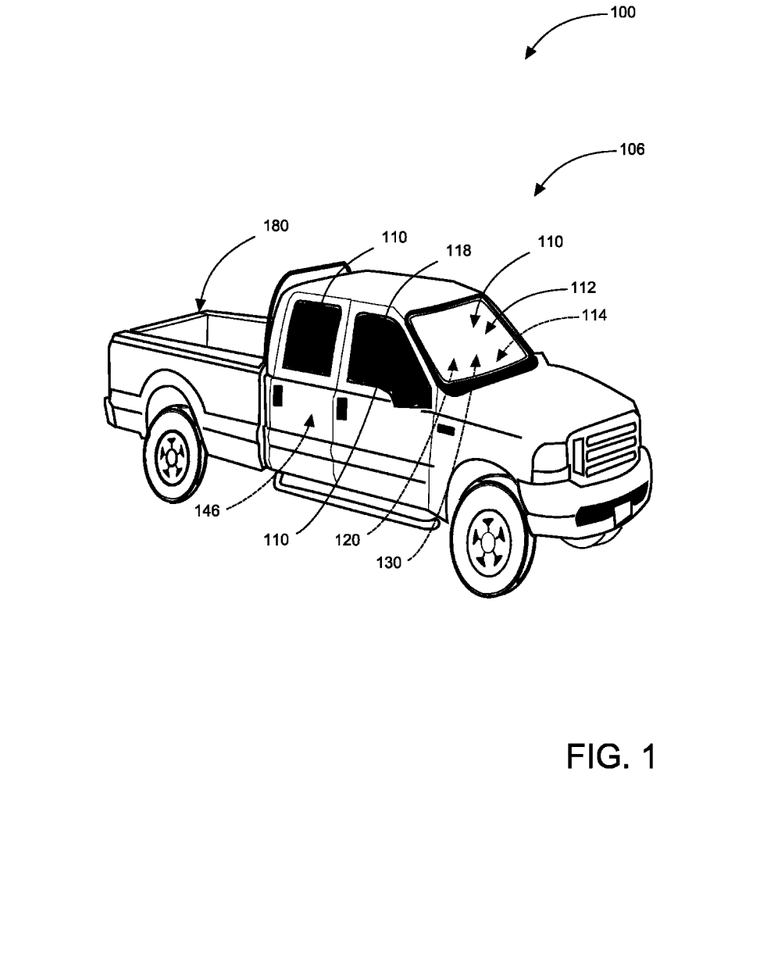
FIG. 1 shows a perspective view illustrating an interiorly controlled vehicle window tinting system in an in-use condition.

Referring now to the drawings using numbers of reference FIG. 1 shows a perspective view illustrating interiorly controlled vehicle window tinting system 100 in in-use condition 106.

Interiorly controlled vehicle window tinting system 100 preferably comprises: at least one vehicle window 110 (window 110 comprising inner surface 114 and outer surface 118); at least one transparent and pliable film layer 130 applied to vehicle window 110; tubing assembly 140 comprising tubing 144 which is substantially transparent and filled with at least one arcable fluid 148. Wire 150 is routed through interior 146 of tubing 144, wire 150 attached to connection bus 134 located at an end of pliable film layer 130. The confines of vehicle window(s) 110 are defined by inner surface 114 and outer surface 118. Pliable film layer 130 comprises tubing 144 having continuous loops that are evenly spaced apart relative to vehicle window 110 (and to each other); pliable film layer 130 comprises plastic in preferred embodiments.

Connection bus 134 is connected via electrical wiring to at least one controller 160 located in an interior of vehicle 180. Controller 160 is preferably in electrical communication with a power supply of vehicle 180. Further, controller 160 is located in interior of vehicle 180 and is operable by an occupant to manipulate a degree of tint by varying a quantity of ultraviolet light produced by arcable fluid 148 which is determined by an amount of current flow controlled by controller 160. Controller 160 in preferred embodiments has at least a lock position and a standby position and incremental positions for manipulation in between (to fine-tune tint.)

The quantity of ultraviolet light produced is dependent on an amount of electricity applied to the wire 150. Controller 160 when manipulated controls an amount of current and resultant heat that is applied to wire(s) 150 positioned within tubing 144. Interiorly controlled vehicle window tinting system 100 is useful to limit an amount of light egressing vehicle windows 110 according to a user's preference. Vehicle window 110 may be laminated and comprises a substantially flat profile. Pliable film layer 130 may be located on outer surface 118 of window 110 in certain embodiments and in other embodiments pliable film layer 130 is located between outer surface 118 and inner surface 114 as a sandwiched layer.

Interiorly controlled vehicle window tinting system 100 may generally comprise an integrally wired photochromic component 120, wiring assembly 124, driver's control panel 200 (including at least one controller 160), and at least one passenger's control panel 220 (including controller 160). Photochromatic component 120 may comprise a plastic film manufactured from plastic that has been chemically treated to embed characteristics of photochromism into the molecular structure of the plastic. Photochromic materials darken when exposed to ultraviolet rays and clears up when the ultraviolet rays are removed. Photochromism generally comprises the ability of a material to darken or change color when exposed to ultraviolet light and to revert to the original transparency of color when the light source is removed. Interiorly controlled vehicle window tinting system 100 may electronically adjust the ability to generate a controlled amount of ultraviolet rays with short wave lengths. This may be preferably accomplished by controlling the amount of current and resultant heat that is applied to the (thin) wire(s) 150 positioned within tubing 144 which may be filled with arcable liquid 148 comprising mercury vapor (or comparable formula that comprises a suitable equivalent). In this way the plastic darkens when exposed to ultraviolet rays and lightens to translucent when ultraviolet rays are removed providing adjustable tinting means. In this way interiorly controlled vehicle window tinting system 100 is able to generate a controlled amount of ultraviolet rays with short wave lengths. When using mercury vapor a ballast may be used to limit the current through tubing wherein interiorly controlled vehicle window tinting system 100 comprises a negative resistance system wherein resistance decreases as current through tubing 144 increases. Tubing 144 may also contain argon gas at low pressure. Argon gas is ionized to strike an arc to the mercury vapor.

Mercury, when used in tubing 144 is a liquid at normal ambient temperatures. It needs to be vaporized and ionized before tubing 144 will conduct electricity and the arc can start. Thus mercury vapor as used by the present invention may require a starter (Argon), which may be contained within the system. In these particular embodiments a third electrode may be mounted near one of the main electrodes and connected through a resistor to the other main electrode. In addition to the mercury, tube 144 is filled with argon gas at low pressure, as previously mentioned. When power is applied, there is sufficient voltage to ionize the argon and strike a small arc between the starting electrode and the adjacent main electrode.

This starting arc discharge heats the mercury and eventually provides enough ionized mercury to strike an arc between the main electrodes. This process is not instantaneous thus allows time for the eyes of the vehicle occupants to adjust (for safety and comfort reasons.) Alternately, some embodiments may include a thermal switch which shorts the starting electrode to the adjacent main electrode, extinguishing the starting arc once the main arc strikes. Wire 150, as used provides the means whereby electricity may be communicated within interiorly controlled vehicle window tinting system 100 in tubing 144. If interiorly controlled vehicle window tinting system 100 is connected directly to a constant-voltage source the current through it may increase until it destroys itself. Therefore a ballast may be used to limit the current therethrough.

By use of control knob 300 of passenger control panel 220 or driver control panel 200, the amount of electricity may be increased or decreased to wire 150, thereby varying the quantity of ultraviolet light produced. This in turn causes the degree of darkness exhibited by the plastic film to vary from darker to lighter or vice versa incrementally (effectively functioning in the same manner as a polarizing screen used in polarized sunglasses.) The present invention may be configured to ensure that only ultraviolet light with a short wave length is produced. Ultraviolet light, which is not visible to the human eye, may produce long term, damaging effects but ultraviolet light with a short wavelength cannot penetrate glass and is thus restricted to an extremely small area of influence thereby not creating a danger to human health.

Figure 3:
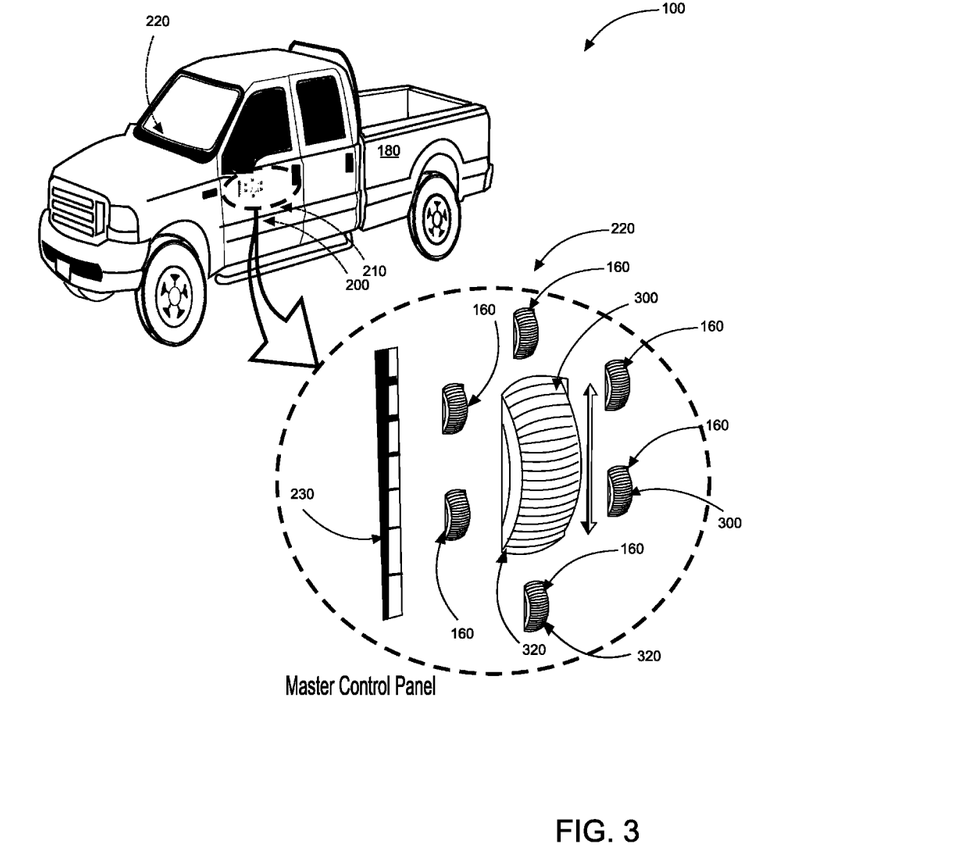
FIG. 3 is a perspective view illustrating a master control panel (comprising controller) of the interiorly controlled vehicle window tinting system preferably mounted to a dash or consol according to an embodiment of the present invention of FIG. 1.

Photochromatic component 120 of the present invention comprising an integrated network of interconnected wires 150 housed within thin, transparent tubing 144 (tubes) which may be attachably coupled to either an exterior or interior surface of vehicle window 110 (which may include vehicle windshield 112.) Further, photochromatic component 120 may be sandwiched in the middle of the glass (as previously mentioned) or in between two thinner layers of glass. The interconnected wires integrated within photochromatic component 120 are connected to passenger control panel 220 or driver control panel 200 preferably located inside vehicle 180 via wiring assembly 124. As seen in FIG. 3, control knob 300 on both the passenger and master control panels 220, 200 may adjust the tint and shade level of each of vehicle windows passenger control panel 220 or driver control panel 200 and vehicle windshield 112, alluded to in FIG. 4. It should further be noted that according to an alternative embodiment of the present invention, a user may be able to push a button on passenger control panel 220 or driver control panel 200 to tint all vehicle windows 110 to either the darkest or lightest tint level simultaneously.

Figure 2:
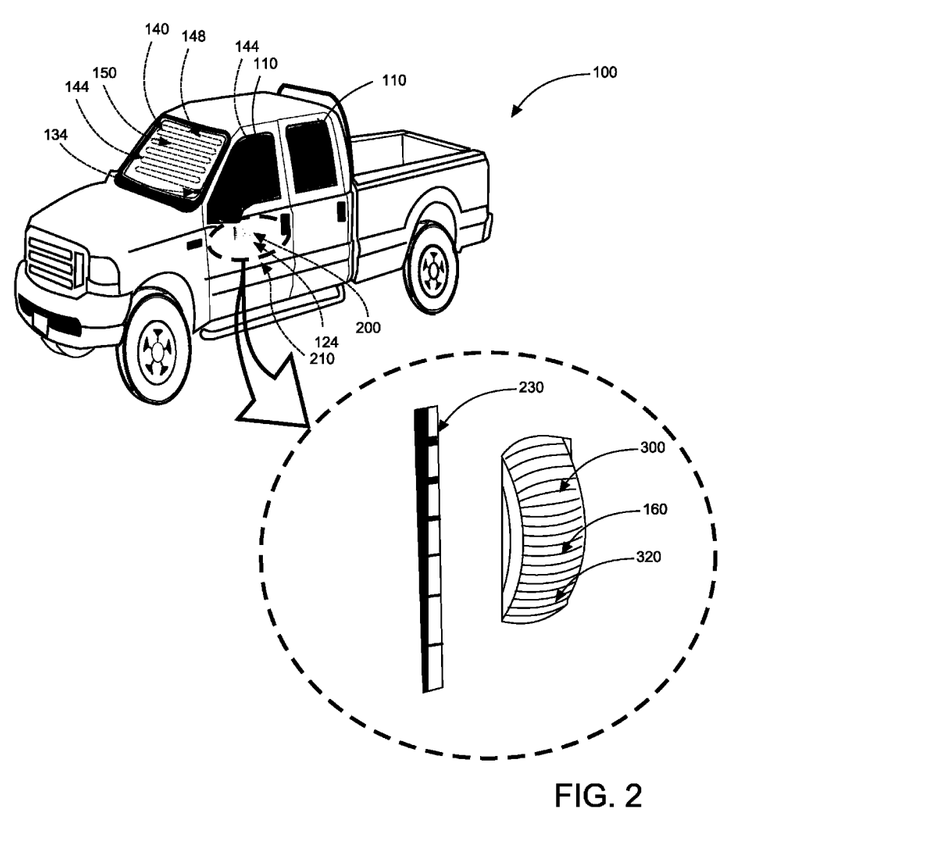
FIG. 2 is a perspective view illustrating a controller of the interiorly controlled vehicle window tinting system (preferably) mounted to a driver's door panel according to an embodiment of the present invention of FIG. 1.

FIG. 2 is a perspective view illustrating control panel 200 of the interiorly controlled vehicle window tinting system 100 preferably mounted to driver's door panel 210 according to an embodiment of the present invention of FIG. 1.

Passenger control panel 220 may comprise a tint level indicator 230 and a control knob 300 comprising rotating wheel 320 having a plurality of indents. Tint level indicator 230 may provide the passenger with an inside-the-vehicle tint gauge thus allowing the passenger to adjust control knob 300 to a passenger-preferred tint setting. Passenger control panel 220 may preferably be mounted to passenger front door panel 240 and both rear door panels.

FIG. 3 is a perspective view illustrating master control panel 200 (comprising at least one controller 160) of interiorly controlled vehicle window tinting system 100 preferably mounted to a dash or consol according to an embodiment of the present invention of FIG. 1.

Driver's control panel 200 may comprise a plurality of pushable buttons (six shown—one for each window, may be more or less in alternate embodiments), tint level indicator 230, and control knob 300 comprising rotating wheel 320 having a plurality of indents similar to passenger control panel 220 as also shown in FIG. 2. Driver's control panel 200 preferably comprises a plurality of rotatable or pushable buttons which permits the driver to manipulate the tint level on any of vehicle window(s) 110 comprising photochromatic component 120 of the present invention. Further, control knob 300 permits the driver to adjust the relative tint level of any of vehicle window(s) 110. Driver's control panel 200 is preferably mounted to driver's door panel 210. The master control panel 200 further permits the driver to lock certain buttons thereby preventing accidental tint adjustment. It should be noted that in some embodiments the present invention master and passenger control panels 200, 220 (respectively) may be installed into the door panel near or adjacent to an existing window control switch or console or other suitable positioning. In this way tint of each of vehicle windows 110 are separately controllable via controller 160. Controllers 160 and other aspects of the present invention may be analog or digital.

Figure 4:
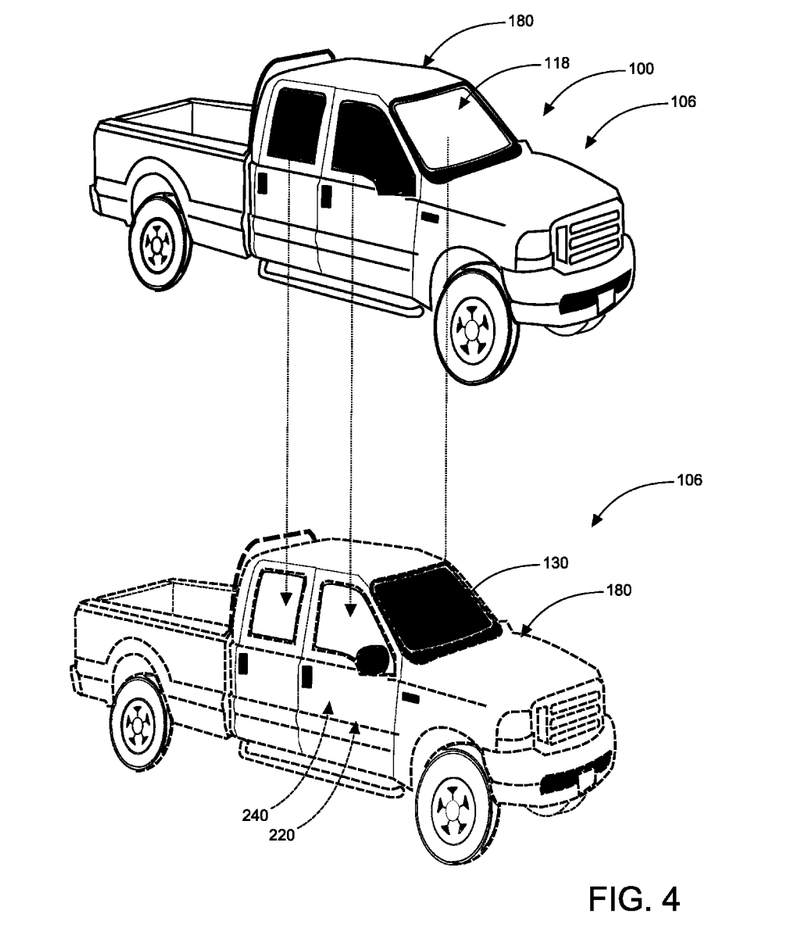
FIG. 4 is a perspective view illustrating the interiorly controlled vehicle window tinting system various in-use conditions according to an embodiment of the present invention of FIGS. 1-3.

FIG. 4 is a perspective view illustrating interiorly controlled vehicle window tinting system 100 in various in-use conditions according to an embodiment of the present invention of FIGS. 1-3.

Vehicle 180 comprising a truck (as shown), S.U.V., car, van, bus, train or other land and non-land vehicles with tinted windows according to an embodiment of the present invention is shown in various in-use conditions. Vehicle 180 shown on top has a tint level set at a lighter level on the front window as may be used for driving including the darker level of (the passenger) vehicle windows 110. The lower vehicle shows a darker tint condition on windshield 112 for example for use when parking. The side windows illustrate different degrees of tint or entire lack of tint that may be used, as desired. The present system permits the vehicle occupants to designate their own tint levels within their respective windows. It should be noted that the vehicle driver has access to a master control unit controlling the tint level on all windows as it is most important for the vehicle driver to be able to fully see out of every window 110 while driving.

Vehicle window 110 within this disclosure may comprise a side window, and/or windshield 112, and/or a rear window. These windows may be separately or simultaneously controlled by controller 160 comprises a plurality of adjustable dials. The lock (lockout) may be used to prevent for example windshield tinting past a certain degree of tint when vehicle 180 is in drive or during certain times (after dark.) Interiorly controlled vehicle window tinting system 100 may be programmed to tint the windows darkly when vehicle 180 is parked to prevent sun from heating the interior of vehicle and to prevent others from determining contents stored within. Other programming may be used to control various aspects of interiorly controlled vehicle window tinting system 100.

Interiorly controlled vehicle window tinting system 100 may be sold as kit comprising the following parts: at least one integrally wired photochromic component window assembly 120, at least one wiring assembly 124, at least one driver's control panel 200, at least one passenger's control panel 220, and at least one set of user's instructions. The present invention may be manufactured and provided for sale in a wide variety of window sizes and shapes for a wide assortment of vehicular applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different tint color combinations, parts may be sold separately, etc., may be sufficient.

Figure 5:
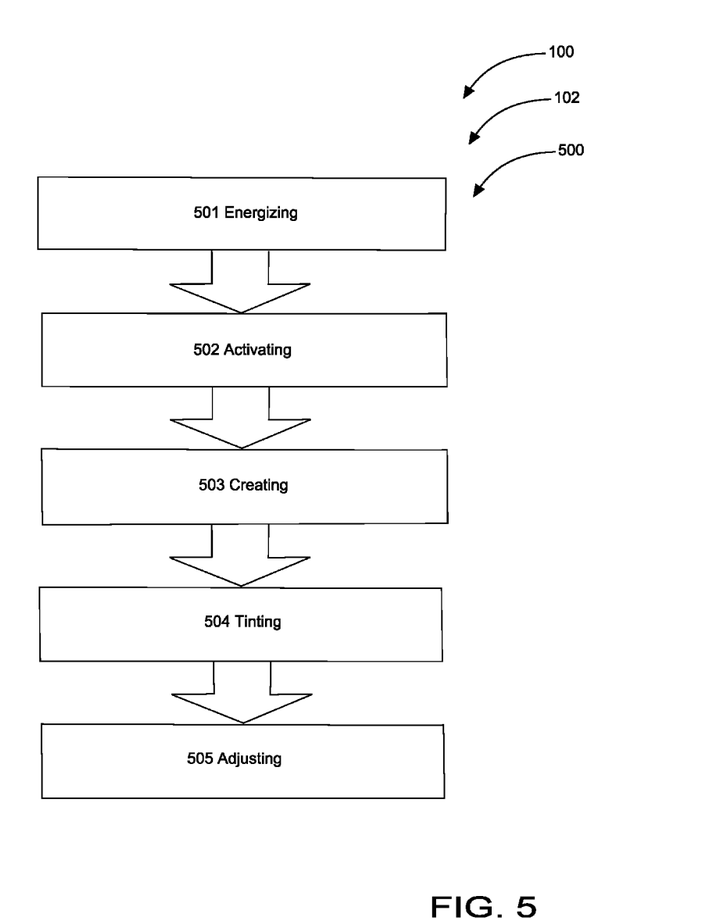
FIG. 5 is a flowchart illustrating a method of use for the interiorly controlled vehicle window tinting system according to embodiments of the present invention of FIGS. 1-4.

FIG. 5 is a flowchart 550 illustrating a method of use 500 for interiorly controlled vehicle window tinting system 100 according to embodiments of the present invention of FIG. 1-4.

A method of use 500 for interiorly controlled vehicle window tinting system 100 comprises the steps of: step one 501 energizing controller 160; step two 502 activating controller 160; step three 503 creating an arc; and step four 504 tinting vehicle window 110 to a user-preferred degree. The method of use may further comprise the step five 505 of adjusting tinting via manipulating controller 160.

It should be noted that the steps described in the method of use can be carried out in many different orders according to user preference. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. An interiorly controlled vehicle window tinting system comprising:
   at least one vehicle window comprising;
   an inner surface;
   an outer surface;
   at least one transparent and pliable film layer applied to the vehicle window;
   a tubing assembly comprising tubing which is transparent and filled with at least one arcable fluid and having a wire routed through an interior of the tubing, the wire attached to a connection bus located at an end of the pliable film layer;
   wherein the arcable liquid comprises mercury vapor;
   wherein the pliable film layer comprises the tubing having continuous loops that are evenly spaced apart relative to the vehicle window;
   wherein confines of the vehicle window are defined by the inner surface and the outer surface;
   wherein the connection bus is connected via electrical wiring to at least one controller located in an interior of a vehicle;
   wherein the controller is in electrical communication with a power supply of the vehicle;
   wherein the controller is located in the interior and is operable by an occupant to manipulate a degree of tint by varying a quantity of ultraviolet light produced by the arcable fluid is determined by an amount of current flow controlled by the controller;
   wherein the controller has at least a lock position and a standby position;
   wherein the quantity of the ultraviolet light produced is dependent on an amount of electricity applied to the wire;
   wherein the controller when manipulated controls an amount of current and resultant heat, that is applied to the wire(s) positioned within the tubing; and
   wherein the interiorly controlled vehicle window tinting system is useful to limit an amount of light egressing the vehicle windows according to a user's preference.

2. The interiorly controlled vehicle window tinting system of claim 1 wherein said vehicle window is laminated and comprises a substantially flat profile.

3. The interiorly controlled vehicle window tinting system of claim 2 wherein said pliable film layer is located on said outer surface.

4. The interiorly controlled vehicle window tinting system of claim 2 wherein said pliable film layer is located between said outer surface and said inner surface as a sandwiched layer.

5. The interiorly controlled vehicle window tinting system of claim 4 wherein the pliable film layer comprises plastic.

6. The interiorly controlled vehicle window tinting system of claim 5 wherein said plastic is chemically treated to embed characteristics of photochromism into a molecular structure of said plastic wherein said plastic darkens when exposed to ultraviolet rays and lightens to translucent when said ultraviolet rays are removed.

7. The interiorly controlled vehicle window tinting system of claim 4 further comprising a ballast to limit the current through the tubing.

8. The interiorly controlled vehicle window tinting system of claim 7 wherein said interiorly controlled vehicle window tinting system comprises a negative resistance system wherein resistance decreases as said current through said tubing increases.

9. The interiorly controlled vehicle window tinting system of claim 8 wherein said tubing also contains argon gas at low pressure.

10. The interiorly controlled vehicle window tinting system of claim 2 wherein said tint of each of said vehicle windows are separately controllable via said controller.

11. The interiorly controlled vehicle window tinting system of claim 10 wherein said vehicle window comprises a side window.

12. The interiorly controlled vehicle window tinting system of claim 10 wherein said vehicle window comprises a windshield.

13. The interiorly controlled vehicle window tinting system of claim 10 wherein said vehicle window comprises a rear window.

14. The interiorly controlled vehicle window tinting system of claim 10 wherein said controller said comprises a plurality of adjustable dials.

15. The interiorly controlled vehicle window tinting system of claim 1 wherein said argon gas is ionized to strike an arc to said mercury vapor.

16. The interiorly controlled vehicle window tinting system of claim 1 wherein said interiorly controlled vehicle window tinting system is able to generate a controlled amount of said ultraviolet rays with short wave lengths.

17. An interiorly controlled vehicle window tinting system comprising:
   at least one vehicle window comprising;
   an inner surface;
   an outer surface;
   at least one transparent and pliable film layer applied to the vehicle window;
   a tubing assembly comprising tubing which is transparent and filled with at least one arcable fluid and having a wire routed through an interior of the tubing, the wire attached to a connection bus located at an end of the pliable film layer;
   wherein the arcable liquid comprises mercury vapor;
   wherein the pliable film layer comprises the tubing having continuous loops that are evenly spaced apart relative to the vehicle window;
   wherein confines of the vehicle window are defined by the inner surface and the outer surface;
   wherein the pliable film layer is located between the outer surface and the inner surface as a sandwiched layer;
   wherein the pliable film layer comprises plastic;
   wherein the plastic is chemically treated to embed characteristics of photochromism into a molecular structure of the plastic wherein the plastic darkens when exposed to ultraviolet rays and lightens to translucent when the ultraviolet rays are removed;
   wherein the interiorly controlled vehicle window tinting system is able to generate a controlled amount of the ultraviolet rays with short wave lengths;
   wherein the vehicle window is laminated and comprises a substantially flat profile;
   wherein the connection bus is connected via electrical wiring to at least one controller located in an interior of a vehicle;
   wherein the controller is in electrical communication with a power supply of the vehicle;
   wherein the controller is located in the interior and is operable by an occupant to manipulate a degree of tint by varying a quantity of ultraviolet light produced by the arcable fluid which is determined by an amount of current flow controlled by the controller;
   wherein the vehicle window(s) comprise at least one side window, a windshield, and a rear window;
   wherein the controller comprises a plurality of adjustable dials;
   wherein the tint of each of the vehicle windows are separately controllable via the controller;
   wherein the controller has a lock position and a standby position;
   wherein the lock position is activated during a drive condition and the standby position is activated by a non-drive condition;
   wherein the quantity of the ultraviolet light produced is dependent on an amount of electricity applied to the wire;
   wherein the controller when manipulated controls an amount of current and resultant heat, that is applied to the wire(s) positioned within the tubing; and
   wherein the interiorly controlled vehicle window tinting system is useful to limit an amount of light entering the vehicle windows according to a user's preference.

* * * * *